United States Patent
Emmerson et al.

(10) Patent No.: US 6,918,833 B2
(45) Date of Patent: Jul. 19, 2005

(54) ELECTRONIC GAMING

(75) Inventors: Francis Emmerson, Windsor (GB); David Westwater, Ascot (GB)

(73) Assignee: Nokia Corporation, Espoo (FI)

(*) Notice: Subject to any disclaimer, the term of this patent is extended or adjusted under 35 U.S.C. 154(b) by 233 days.

(21) Appl. No.: 10/157,146

(22) Filed: May 30, 2002

(65) Prior Publication Data

US 2002/0183111 A1 Dec. 5, 2002

(30) Foreign Application Priority Data

May 31, 2001 (GB) .............................................. 0113191

(51) Int. Cl.$^7$ ................................................. A63F 9/24
(52) U.S. Cl. ........................ 463/23; 463/43; 340/323 R
(58) Field of Search ...................... 463/1–8, 23, 40–44, 463/30, 36; 273/148 R, 148 B; 700/91; 340/323 R

(56) References Cited

U.S. PATENT DOCUMENTS

| 6,347,993 B1 | 2/2002 | Kondo et al. |
| 2002/0068826 A1 | 6/2002 | Takeda et al. |
| 2002/0160835 A1 | 10/2002 | Fujioka et al. |

FOREIGN PATENT DOCUMENTS

| EP | 0971311 A1 | 1/2000 |
| EP | 1010447 A1 | 6/2000 |
| EP | 1052001 A2 | 11/2000 |
| EP | 1 052 001 A2 | 11/2000 |
| EP | 1070522 A2 | 1/2001 |
| EP | 1072297 A1 | 1/2001 |
| EP | 1 172 131 A2 | 1/2002 |
| EP | 1 208 887 A2 | 5/2002 |
| JP | 01250287 | 10/1989 |

OTHER PUBLICATIONS

European Search Report.
Super Street Fighter II Turbo Released: Apr. 1994.

Primary Examiner—Mark Sager
(74) Attorney, Agent, or Firm—Antonelli, Terry, Stout & Kraus, LLP

(57) ABSTRACT

The present invention resides in an electronic gaming system comprising gaming parameters defining one or more gaming characters or entities, the system providing means whereby at least one skill type attribute is associated with a gaming character/entity, the system providing means whereby a changing aptitude level value is associated with the skill type attribute, the system providing for means, responsive to the gaming character electing to execute a gaming move using skill type attribute, reducing the aptitude level value by a predetermined amount. The present invention makes efficient use of memory, which in a mobile gaming platform such as a mobile phone is often limited by allowing for more involved and enhanced gameplay without substantially increasing the requirement for memory or processing power. Furthermore, the gaming system of the present invention provides for a compact and manageable gaming solution particularly suitable for mobile gaming.

18 Claims, 2 Drawing Sheets

ELECTRONIC GAMING

BACKGROUND OF THE INVENTION

Field of the Invention

The present invention relates to electronic games, in particular electronic games in the context of mobile gaming.

SUMMARY OF THE INVENTION

The present invention, in one aspect, resides in an electronic gaming system comprising gaming parameters defining one or more gaming characters or entities, the system providing means whereby at least one skill type attribute is associated with a gaming character/entity, the system providing means whereby a changing aptitude level value is associated with the skill type attribute, the system providing for means, responsive to the gaming character electing to execute a gaming move using the skill type attribute, reducing the aptitude level value by a predetermined amount.

The present invention makes efficient use of memory, which in a mobile gaming platform such as a mobile phone is often limited. by allowing for more involved and enhanced gameplay without substantially increasing the requirement for memory or processing power. Furthermore, the gaming system of the present invention provides for a compact and manageable gaming solution particularly suitable for mobile gaming.

More specifically, the present invention provides a dynamic gaming system in which moves or aspects of the game that are under the control of an end user and that are not carried out by the user in a proficient manner (comparative to a pre-determined level) are used in the gaming system in a negative manner to count against the end user's player character. In other words the gaming parameters are modified in dependence on how the game is being played by the end user. This provides for more realistic gameplay. In this way, a game character or other entity (hereinafter referred to as a player character) associated with the end user is not just able to benefit from an increase in the skill level ability of the player character, but is also exposed to the risk of having a reduction in skill level ability of the player character.

The gaming system of the present invention is based upon the provision of an ability and a corresponding counter ability. For example, the system may define for and against attributes as:
Ability1
CounterAbility1
Ability2
CounterAbility 2

In some instances, the counter ability may not be relevant to the player character, but may, instead, be a property of an object. For example, in the case of an adventure game, a player character might have the following attributes:
AttackMagic—the ability to attack with magic.
DefMagic—the ability to defend against a magic attack.
PickLock—a lock picking skill.

In this context, the gaming system of the invention is applied in an analogous way, except that in the case of PickLock, it is the lock itself (i.e. a game entity, rather than a game character) that may have the counter ability: DefPickLock—which is the lock's ability to resist being picked.

While the broad concept of dynamically altering a gaming character's abilities is already known, the invention presents a way of modifying these attributes during the course of the game based upon the end user's (and hence player character's) actions within the game.

Traditionally, this type of gaming approach works in one of two ways. A player character completes a task or collects an item and is awarded points for doing so. These points can be allocated or accrued at the end user's (player's) discretion in order to increase certain attributes. Typically, these abilities will only increase, for example, an end user's player character in the form of a warrior will not become less able to wield a sword if the player character is defeated in one or more successive fights. The way in which these skills are modified are directly controlled by the end user via the user's player character through the choice of where experience points are allocated.

Other attributes such as health, energy, magic power ("fuel" type attributes) etc will increase or decrease. This is usually achieved through collecting food, potions, medical packs etc. This invention does not deal with this type of attribute, rather it is concerned with a gaming system for dynamically altering "skill" type aptitudes (such as, sword wield power of the warrior in the above illustration).

Accordingly, the invention provides for a trade off between using a skill and improving that skill. In order to use a skill, the end user must initially be willing to accept a drop in the level of that skill for the users character player. Where the character player is successful in completing the task in respect to which the skill was used (measured against a set of pre-determined criteria), the player will be "refunded" the drop in that ability as a result of the satisfactory outcome. Where the player is more than successful, that is completes the task to a more than satisfactory level, the drop in skill is refunded and another point (for example bonus point) is added to the original pre-task/pre-move skill level.

As an illustration, in a spy game the player character has the ability to search for secrets. The end user elects to control his player character to examine a filing cabinet, and in doing so the end user accepts a drop in his play character's ability to search for secrets. On examining the filing cabinet the player character finds a key to a door, and hence the task has been completed successfully, and because of this the drop in skill is refunded to the player character. However, if the player character finds nothing, then the drop is not refunded, and this serves as a reflection of the fact that the player character is not talented at searching. In a still further variation, if the character discovers a key, plus a drawer with the false bottom containing the plans of the building's security network, then the drop is not only refunded but the skill is increased over and above its original value as a reflection of the acute searching abilities of the player character.

As explained above, player character skills are used in conjunction with opposite attributes possessed by the other objects or characters within the game. In the above example, the hidden drawer in the filing cabinet has the ability to resist searching and so remain concealed. Real-time comparison of the two attributes by the games engine allows the game to determine whether or not the player has been successful.

In one embodiment, the system computes an outcome of an elected move or action based on the for and against attribute and moreover aptitude levels of the characters and entities involved in the move. The system additionally may apply a random factor so that the outcome of a given move is not based solely on a comparison of for and against aptitudes but also takes into account a random factor introduced by the system in order to make the outcome less predictable. For instance the random factor may apply a weighting to one of the aptitude levels.

The player character's searching attribute does not increase by collecting objects or through an end user controlled allocation of some other type of experience points. Instead it is altered dynamically through the way the end user plays the game. In the example of the warrior character above, if the warrior were to use the attribute gaming system of the present invention he would become a worse fighter with every defeat.

In a preferred embodiment, the player character has no direct control over its experience points other than through its actions as it plays the game. This is particularly beneficial in the context of mobile gaming because it permits an increase in the degree of realism and variation available in a game without having to involve the end user in time consuming analysis of their player character's statistics.

The invention from another aspect provides a client-server system in which games content can be downloaded from a server to a client terminal, the games content comprising gaming parameters and an attribute system that is adapted to be applied to the gaming parameters so as to affect ability levels of the gaming characters in a negative manner if an action or move of the gaming parameter is carried out to a performance determined to be below a pre-defined threshold.

Accordingly, the invention extends to areas concerned with client-server systems and the downloading and more generally enabling the provision of content for a client terminal.

Other aspects and features of the invention are defined in the appended claims.

BRIEF DESCRIPTION OF THE DRAWINGS

In order to aid a better understanding of the present invention, an embodiment of the invention will now be described. This should not be construed as limiting the invention but merely as an example of a specific way of putting the invention into effect. In particular, the invention will be described with reference to the accompanying drawings in which.

DETAILED DESCRIPTION OF THE INVENTION

Figure 1:
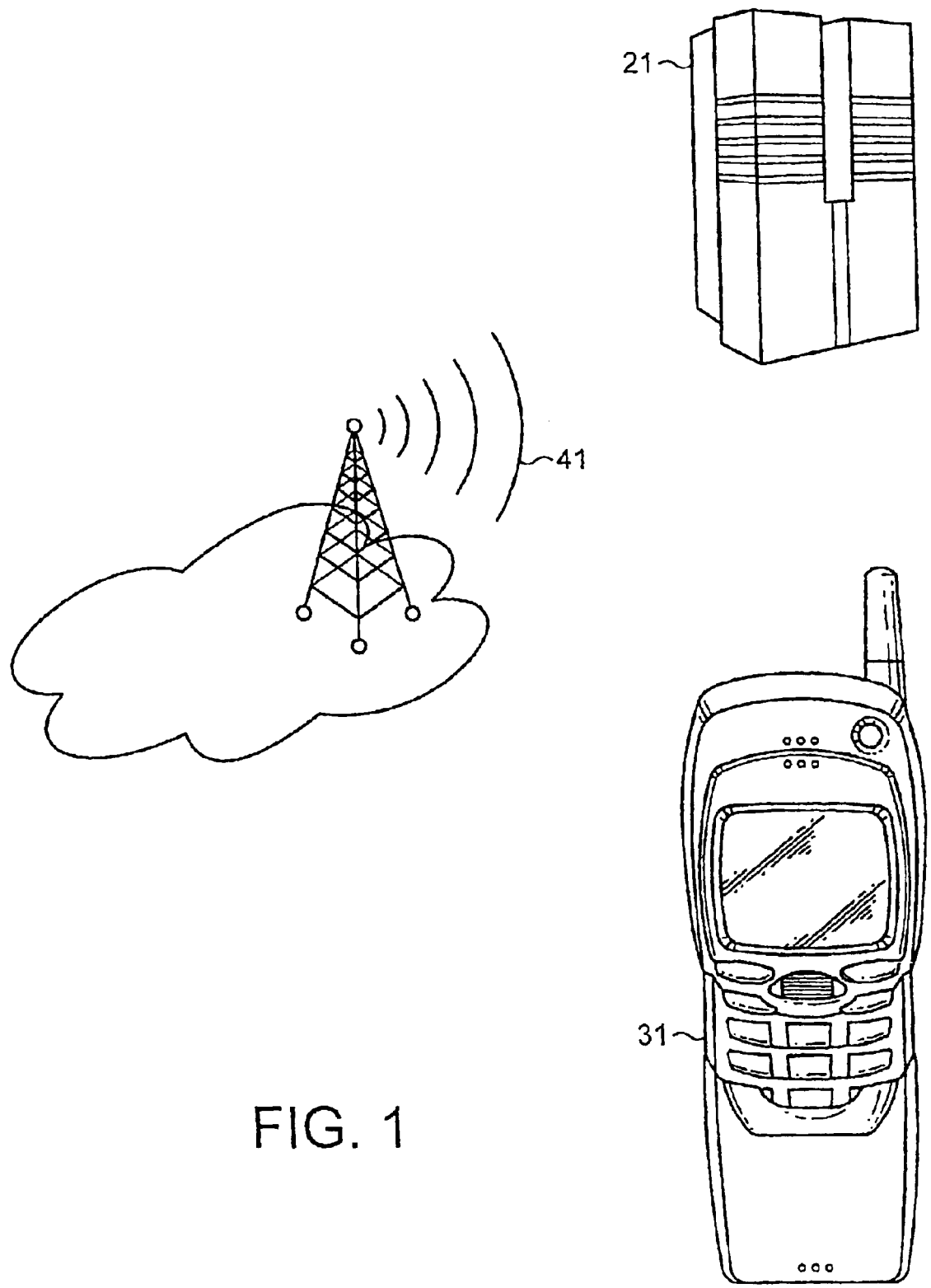
FIG. 1 is a schematic of client-server system in accordance with a preferred arrangement of the present invention.

FIG. 1 outlines three entities of the present invention, namely a server 21 that holds content for downloading, an end user's mobile phone 31 that is able to download the content, and an operator network 41 that provides a telecommunications service to the mobile phone 31. The server 21 has a unique URL address and using this can be accessed by the end user through the mobile phone 31 which may be WAP, iMODE or 3G enabled.

In the following example, reference will be made to mobile gaming and games content for a mobile phone platform, although the invention is in no way intended to be limited to mobile gaming.

Mobile gaming is a term used to refer to all aspects of electronic games in the context of mobile communications. It is not uncommon nowadays for mobile phones to have, pre-loaded on a memory of the phone, content relating to one or more electronic games. The games can be played on the mobile phone using the phone's processor to run the game and through the phone's User Interface (UI) normally involving the use of the display and one or more of the keys.

In order to play a game, the end user navigates through the phone's various main menu options to the Games option and then selects the particular electronic game he or she wishes to play. Certain keys of the mobile phone's keypad will be pre-assigned for enabling the end user to control certain predetermined features of the game, usually in relation to other features of the game which are under the control of the software of the game. In this way, the end user can be regarded as playing 'against the computer'. Additionally, in a two (or more) player game, each end user (player) has control over his/her particular game's characters or features with which he/she plays against the other player(s).

Typically, an electronic game that is designed to be played on a mobile phone platform is created by a content provider, who may be the mobile phone manufacturer or a third party. Like any platform wishing to run games software of an electronic game, the mobile phone takes advantage of its memory and processor. The electronic game function comprises a games engine that provides the general functions of the game including instructions and routines for gameplay, for example by drawing of library functions that define how games characters may interact during game play. The electronic game also has gaming parameters that set out the environmental factors that define the backdrop to the game. Then there are gaming parameters relating to characters of the games, these being entities of the game under user control and with which the user during gameplay associates himself, for instance a team in a sports game, or a fighter In a combat game. In the games content, a combination of these factors define the look and feel of the game, its characters, its objectives, its rules of operation.

In order to afford variation in gameplay, in-built into the games software, typically, is the ability to have different levels of gameplay ranging in complexity. This is usually implemented in the software by making changes to characters, features, aspects and other parameters of the basic gameplay. The content provider may additionally create new levels and/or versions for the game. When new levels and/or versions are applied to the game it modifies the games content. Modified games content has associated with it an identifier tag that identifies the version that has been used in its construction.

In the context of a preferred form of the present invention, the content provider continues to design and develop more challenging and innovative image attribute systems, while the user will continue to remain interested and engaged. In addition, the mobile phone manufacturer or content provider benefits in increased traffic and stimulating content for the mobile phone manufacturer's internet site.

The mobile phone manufacturer may embed the games content onto the phone during manufacture, or authorize downloading of the games content onto the phone. Thus, the user of the mobile phone is equipped for mobile gaming.

In one example of an implementation of the present invention, the attribute gaming system is applied to an American Football electronic game.

In this example, an end user begins the game with a team which has 4 main attributes. These are classed as:

DefRush—the ability to defend against rushing plays.

DefPass—the ability to defend against passing plays.

OffRush—the ability to carry out rushing plays.

OffPass—the ability to carry out passing plays.

For each of these attributes the end user's team (player team) will be allocated a set number of points. At the start of a new game (when a new team is generated), every end user controlled team wall have exactly the same set of attributes.

Figure 2:
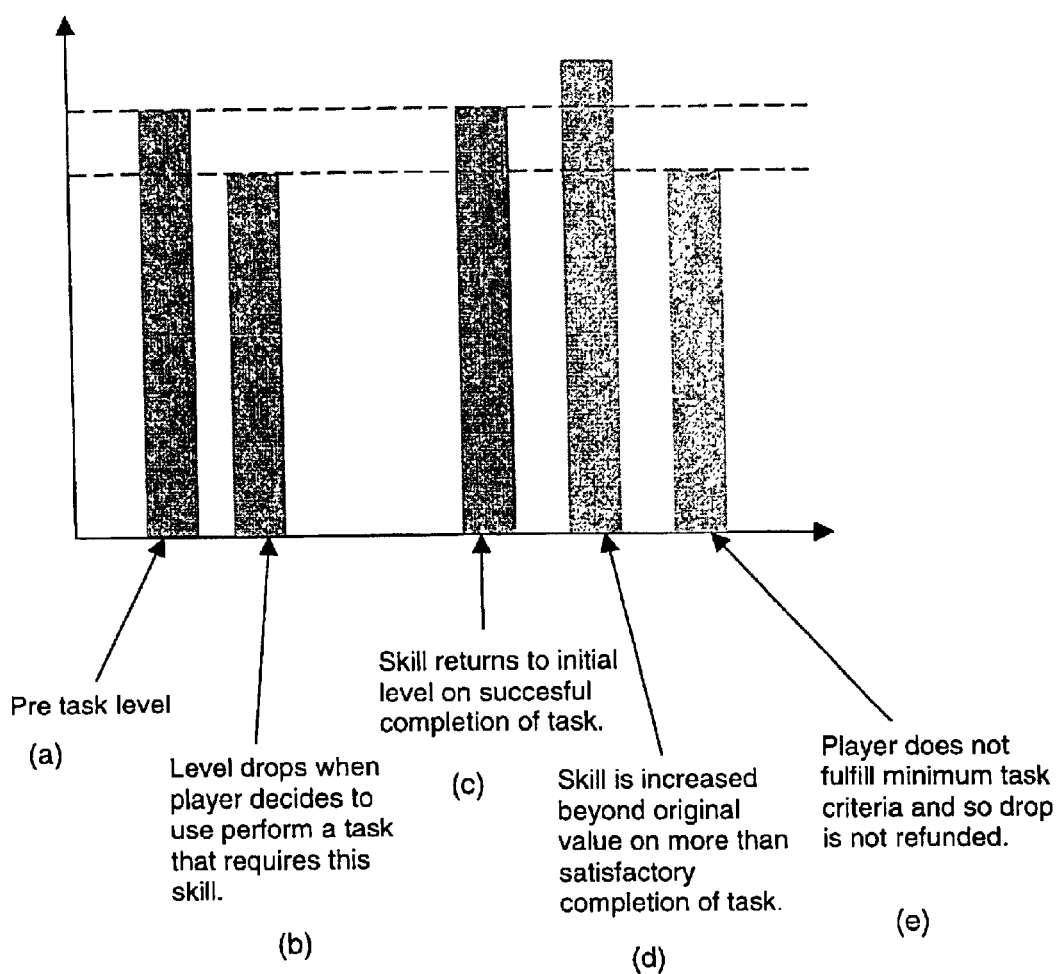
FIG. 2 is an illustration of a manner in which an embodiment of the present invention may work.

Referring to FIG. 2, the end user's player is initially assigned a predetermined ability level (FIG. 2(a)). Every time an end user through the user's player team executes an offensive play, the ability for that type of play is reduced by one point FIG. 2(b)). Successfully completing the minimum criterion for this play adds one points back onto the offensive play ability (FIG. 2(c)). Surpassing the minimum criterion will add more than one point onto the appropriate ability (FIG. 2(d)). However, if the player team does not meet the minimum pre-set target level for accomplishing the move the original drop is not refunded (FIG. 2(e)).

For example, the player team chooses a short gain rushing play. This ability drops by one point as a forfeit for choosing that play. The outcome of the move is that the play is successful and the player team gains 3 yards. This is the minimum success level (as defined by the predetermined criteria) for this play and so the ability is recouped by one point.

Defensive ability levels are increased or decreased differently. The end user player team selects a defensive play. If the offensive side successfully runs with the ball, and the minimum criteria for the offensive play is met, the defending player team will lose a point from their Defensive rushing ability. If the defender stops the offensive side from achieving the minimum level for a play the Defending player team will neither lose nor gain a point. If the Defending team stops a play and achieves some other higher objective (e.g. turning the play around, sacking the quarterback, intercepting a pass etc) then they will gain more than one point to the corresponding defensive ability to that of the play chosen by the offensive team.

The system is configured such that the resulting abilities are used as modifiers in the games engine algorithm which determines the outcome of the play.

Thus, by allowing the way an end user plays the game to modify the team, it is possible to introduce greater diversity into the game. For example, two end users who wish to compete against each other will have more than just luck as the deciding element in their game. Also, by allowing a team to change and be affected by the gameplay the level of identification that an end-user has with "his" team also increases.

In another example, the attribute gaming system is applied to a wartime strategy game. Such a game may make use of the following attributes:

CodeMake—the ability of the players army to successfully encrypt a message

CodeBreak—the ability to decrypt coded messages sent by the opposition

AirAttack—the ability of the player's airforce to carry out a successful air attack AirDefense—. . .

By means of the preferred arrangement of the invention the user has the option to download from the mobile phone manufacturer's server 21 new levels and/or versions so as to create a new and/or more difficult or different level. The end user accordingly requests the download of new levels and/or versions from the server 21 via the operator's network 41. The server 21 holds files of specific type containing the games data. Selecting one of those files results in the download of the file to the mobile phone. After validation by the games engine and game itself by means of a security and authentication process, the games data file is installed to the mobile phone's permanent memory.

Transfer of signals between the user's mobile phone and the server may use any appropriate modes such as WAP, SMS and 3G data transfers as well as wired networks.

The present invention may be embodied in other specific forms without departing from its essential attributes.

Reference should thus be made to the appended claims and other general statements herein rather than to the foregoing description as indicating the scope of the invention.

Furthermore, each feature disclosed in this specification (which terms includes the claims) and/or shown in the drawings may be incorporated in the invention independently of other disclosed and/or illustrated features. In this regard, the invention includes any novel feature or combination of features disclosed herein either explicitly or any generalization thereof irrespective of whether or not it relates to the claimed invention or mitigates any or all of the problems addressed.

The appended abstract is file herewith is included in the specification by reference.

What is claimed is:

1. An electronic gaming system comprising:
    gaming parameters defining at least one gaming character or at least one gaming entity, at least one skill type attribute associated with the at least one gaming character or the at least one gaming entity and a changing aptitude level value associated with the at least one skill type attribute; and wherein:
    in response to the at least one gaming character or the at least one gaming entity electing to execute a gaming move using the at least one skill type attribute, the aptitude level value is reduced by a predetermined amount.

2. An electronic gaming system according to claim 1, wherein the gaming system determines performance of an executed gaming move in comparison with a set of pre-defined performance criteria, and the gaming system compensates for compensating the aptitude level value.

3. An electronic gaming system according to claim 2, wherein if the gaming system determines that performance of the gaming move is below a minimum predetermined performance criteria, then the gaming system does not add to the aptitude level value.

4. An electronic gaming system according to claim 2, wherein if the gaming system determines that performance of the executed gaming move satisfies a minimum predetermined performance criteria, then the gaming system adds to the aptitude level value by the predetermined amount.

5. An electronic gaming system according to claim 2, wherein if the gaming system determines that performance of the executed gaming move exceeds a minimum predetermined performance criteria, then the gaming system adds to the aptitude level value by an amount exceeding the predetermined amount.

6. An electronic game system according to any one of claims 2–5, wherein the gaming system is configured to determine aptitude level values between the at least one gaming character and the at least one gaming entity.

7. An electronic gaming system according to claim 1, wherein in response to the at least one gaming character or the at least one gaming entity electing to execute a gaming move using the at least one skill type attribute, the aptitude level value is reduced by a predetermined amount every time the at least one gaming character or the at least one gaming entity elects to execute a gaming move or action using the at least one skill type attribute, the reduction of the aptitude level value by a predetermined amount occurring before execution of the gaming move or action using the at least one skill type attribute.

8. A method according to claim 2, wherein reducing the aptitude level value by a predetermined amount in response to the at least one gaming character or the at least one gaming entity electing to execute a gaming move using the at least one skill type attribute comprises reducing the aptitude level value by a predetermined amount every time the at least one gaming character or the at least one gaming entity elects to execute a gaming move or action using at least one skill type attribute, and wherein reduction of the aptitude level value occurring before execution of the gaming move or action using the at least one skill type attribute.

9. A method for modifying an electronic gaming system including games content defining at least one gaming parameter, the method comprising:

providing skill type attributes associated with at least one gaming character or gaming entity, providing an aptitude level value associated with the skill type attributes, reducing the aptitude level value by a predetermined amount in response to the at least one gaming character or gaming entity electing to execute a gaming move using one of the skill type attributes.

10. A client-server system for downloading games content comprising:

gaming parameters defining at least one gaming character or at least one gaming entity, at least one skill type attribute associated with the at least one gaming character or the at least one gaming entity and a changing an aptitude level value associated with the at least one skill type attribute; and wherein the system in response to the at least one gaming character or the at least one gaming entity electing to execute a gaming move using the at least one skill type attribute, reduces the aptitude level value by a predetermined amount.

11. A client-server system for downloading games content according to claim 10, wherein, responsive to the at least one gaming character or the at least one gaming entity electing to execute a gaming move using the at least one skill type attribute, the aptitude level value is reduced by a predetermined amount every time the at least one gaming character or the at least one gaming entity elects to execute a gaming move or action using the at least one skill type attribute, the reduction of the aptitude level value by a predetermined amount occurring before execution of the gaming move or action using the at least one skill type attribute.

12. A gaming device including games content for a gaming system, comprising:

a memory for storing the games content and a controller for processing the games content; and wherein the controller is operable to provide at least one skill type attribute associated with at least one gaming character or at least one gaming entity of the games content, to provide an aptitude level value associated with the at least one skill type attribute, and to reduce the aptitude level value by a predetermined amount in response to the at least one gaming character or the at least one gaming entity electing to execute a gaming move using the at least one skill type attribute.

13. A gaming device according to claim 12, wherein the controller is operable to reduce the aptitude level value by a predetermined amount in response to the at least one gaming character or the at least one gaming entity electing to execute a gaming move using the skill type attribute such that every time the at least one gaming character or the at least one gaming entity elects to execute a gaming move or action using the skill type attribute, the reduction of the aptitude level value by a predetermined amount occurring before the execution of the gaming move or action using the at least one skill type attribute.

14. A computer program product on a carrier having an electronic game stored by a memory which, when executed by a processor performs a process comprising:

providing skill type attributes associated with at least one gaming character or at least one gaming entity, providing an aptitude level value associated with the skill type attributes and reducing the aptitude level value by a predetermined amount in response to the at least one gaming character or the at least one gaming entity electing to execute a gaming move using the at least one skill type attribute.

15. A gaming device according to claim 14, wherein:

the gaming device is a handheld electronic device.

16. A computer program product according to claim 14, wherein the product when executed by a processor allows reducing the aptitude level value by a predetermined amount in response to the at least one gaming character or the at least one gaming character electing to execute a gaming move using the skill type attribute such that every time the at least one gaming character or the at least one gaming entity elects to execute a gaming move or action using the skill type attribute, the reduction of the aptitude level value occurring before the execution of the gaming move or action using the at least one skill type attribute.

17. An apparatus for providing content for an electronic game platform, comprising:

an electronic gaming system comprising gaming parameters defining at least one skill type attribute associated with at least one gaming character or at least one gaming entity and at least one skill type attribute associated with the at least one gaming character or the at least one gaming entity, and wherein the apparatus provides a changing aptitude level value associated with the at least one skill type attribute, and responsive to the at least one gaming character or the at least one gaming entity electing to execute a gaming move using the at least one skill type attribute, reduces the aptitude level value by a predetermined amount.

18. An apparatus according to claim 17, wherein in response to the at least one gaming character or the at least one gaming entity electing to execute a gaming move using the at least one skill type attribute, the aptitude level value is reduced by a predetermined amount every time the at least one gaming character or the at least one gaming entity elects to execute a gaming move or action using the skill type attribute, the reduction of the aptitude level value by a predetermined amount occurring before the execution of the gaming move or action using the at least one skill type attribute.

* * * * *